United States Patent

Duvdevani et al.

[11] Patent Number: 5,698,640
[45] Date of Patent: Dec. 16, 1997

[54] LOW BROMINE ISOBUTYLENE-CO-4-BROMOMETHYLSTYRENE COMPOSITIONS FOR SEVERE DUTY ELASTOMER APPLICATIONS

[75] Inventors: Ilan Duvdevani, Houston; Neil Frederick Newman, Kingwood, both of Tex.

[73] Assignee: Exxon Chemical Patents Inc., Houston, Tex.

[21] Appl. No.: 691,109

[22] Filed: Aug. 1, 1996

[51] Int. Cl.$^6$ ............................ C08F 8/20; C08K 5/41
[52] U.S. Cl. .................... 525/333.4; 525/353; 525/356; 524/394; 524/432; 524/576; 524/578; 428/398; 138/118; 215/355
[58] Field of Search .................. 525/333.4, 356, 525/353; 428/398; 138/118; 215/355; 524/394, 432, 576, 578

[56] References Cited

U.S. PATENT DOCUMENTS

| | | | |
|---|---|---|---|
| 5,013,793 | 5/1991 | Wang et al. | 525/333.4 X |
| 5,063,268 | 11/1991 | Young | 525/333.4 X |
| 5,162,445 | 11/1992 | Powers et al. | 525/333.4 |
| 5,246,778 | 9/1993 | Costemalle et al. | 525/333.4 X |
| 5,512,638 | 4/1996 | O'Donnell | 525/333.4 |

*Primary Examiner*—Fred Teskin
*Attorney, Agent, or Firm*—Myron B. Kurtzman

[57] ABSTRACT

Tire curing bladders are made from poly(isobutylene-co-4-bromomethylstyrene) with a benzylic bromine content of from 0.15 to 0.45 mole percent, vulcanized with a cure system of 1,6-hexamethylene-bis(sodium thiosulfate) and zinc oxide. The vulcanizate has low residual benzylic bromine content which leads to enhanced stability under severe duty applications, reduced hot tension set, and reduced adhesion or co-cure to halobutyl tire innerliners.

20 Claims, No Drawings

1

LOW BROMINE ISOBUTYLENE-CO-4-BROMOMETHYLSTYRENE COMPOSITIONS FOR SEVERE DUTY ELASTOMER APPLICATIONS

FIELD OF THE INVENTION

The present invention relates to lightly brominated poly(isobutylene-co-4-methylstyrene), vulcanizable mixtures containing the brominated copolymer and a cure package, and the resulting vulcanizates. The invention also relates to products made from the vulcanizate which are useful at elevated temperatures and other severe conditions.

BACKGROUND OF THE INVENTION

Curing bladders are commonly used in presses to mold and cure useful articles such as tires. Tire curing bladders are typically inflated with steam, for example, at 200 psi and 190° C., to press the uncured tire outwardly against a negative mold surface. The pressure exerted by the bladder forms the tire into the desired shape for the tread pattern and sidewall configuration. The application of heat and pressure cures the tire to vulcanize the rubbery polymers comprising the tire material.

Tire curing bladders are ordinarily made from butyl rubber crosslinked or vulcanized to form a polymer having good heat stability and physical properties. Even so, because of the high temperature and extreme conditions of use occasioned by the repeated expansion and contraction of the tire curing bladder, bladders made from these polymers have a limited useful life.

Recently isobutylene-co-4-bromomethylstyrene polymers have been employed to make tire curing bladders. These polymers are inherently more resistant to oxidation because of the saturated polymer backbone. However, these brominated polymers can stick or co-cure with the halobutyl innerliners used in the tires so that separation of the bladder from the tire following curing of the tire can be more difficult. One approach to solving this problem has been the use of a graphite additive in the brominated copolymer of isobutylene and p-methylstyrene as described in EP 0,711, 642-A2 filed by the Goodyear Tire and Rubber Company. The graphite is said to enhance lubricity, lower adhesion of the cured tire innerliner to the tire curing bladder, and lower the hot tension set (bladder growth over useful life).

U.S. Pat. No. 5,385,459 to Graves et al. discloses grafting polyethers, polylactones, or polyesters to brominated p-methylstyrene-isobutylene copolymers to make tire curing bladders said to have self-release properties.

It has been known to use 1,6-hexamethylene-bis(sodium thiosulfate) (HTS) as a stabilizing agent, more specifically as a reversion inhibitor, in sulfur-vulcanized masterbatches of general purpose rubber. See U.S. Pat. Nos. 4,417,012; 4,520,154; and 4,587,296 to Moniotte; and 5,508,354 to Talma et al. More recently, it has been noted that HTS and zinc oxide can be used to accelerate the cure of black tire sidewall compounds based on brominated poly(isobutylene-co-p-methylstyrene) (BIMS) elastomers. Ignatz-Hoover et al., "Black Tire Sidewall Compounds Based on Brominated Poly(Isobutylene-co-p-Methylstyrene) Elastomer and Accelerated with 1,6-Hexamethylene-bis(Sodium Thiosulfate)", presented at a meeting of the Rubber Division, American Chemical Society, Cleveland, Ohio, paper no. 110, Oct. 17–20, 1995. This paper discloses vulcanizing two BIMS elastomers with HTS and zinc oxide. The BIMS elastomers contained 0.75 mole percent benzylic bromide and 5 mole percent p-methylstyrene comonomer; and 1.2 mole percent benzylic bromide and 7.5 mole percent p-methylstyrene comonomer.

Another study reports the distribution of additives between phases in rubber blends containing brominated poly(isobutylene-co-4-methylstyrene). This study presents results of curative distribution and migration in blends of a brominated isobutylene-methylstyrene copolymer and styrene-butadiene rubber, with and without HTS. Dias et al., "Curative Migration in Rubber Compounds Containing Brominated Polyisobutylene-co-4-Methylstyrene," presented at a meeting of the Rubber Division, American Chemical Society, Cleveland, Ohio, paper no. 96, Oct. 17–20, 1995.

SUMMARY OF THE INVENTION

It has been found that poly(isobutylene-co-4-methylstyrene) which has been brominated to a relatively low bromine content can be effectively vulcanized to form a vulcanizate suitable for severe duties such as tire curing bladders. These vulcanizates are crosslinked very efficiently, and leave an extremely low unreacted benzylic bromine content. The low benzylic bromine residual contributes to the stability of the vulcanized polymer by reducing the number of reactive sites, and also facilitates inhibiting the co-cure or adhesion of tire curing bladders made from the vulcanizates to halobutyl tire innerliners when used in the manufacture of tires.

Accordingly, in one aspect, the present invention provides a vulcanizable mixture of brominated poly(isobutylene-co-4-methylstyrene) and a cure package wherein the brominated poly(isobutylene-co-4-methylstyrene) contains from 0.10 to 0.45, preferably 0.15 to 0.35 mole percent benzylic bromine. The cure package preferably comprises 1,6-hexamethylene-bis(sodium thiosulfate) (HTS), zinc oxide, an optional accelerator and an optional retarder.

Another aspect of the invention is a poly(isobutylene-co-4-bromomethylstyrene) especially adapted for use in the vulcanizable mixture just described. The polymer is a poly(isobutylene-co-4-bromomethylstyrene-co-4-methylstyrene) comprising from 0.1 to 0.45, preferably 0.15 to 0.35 mole percent benzylic bromine wherein the total bromomethylstyrene and methylstyrene content is less than 2 mole percent, preferably from 0.2 to 1 mole percent.

In another aspect, the present invention provides a vulcanized poly(isobutylene-co-4-bromomethylstyrene) obtained by vulcanizing the vulcanizable mixture just described.

The invention also provides a vulcanizate of a poly(isobutylene-co-4-bromomethylstyrene) comprising from 0.1 to 0.45, preferably 0.15 to 0.35 mole percent 4-bromomethylstyrene vulcanized to an extent wherein the vulcanizate is essentially free of benzylic bromine.

In another aspect, the present invention provides a tire curing bladder, high temperature hose, gasket and other temperature-resistant articles made from the vulcanizates. In another aspect of the invention, pharmaceutical closures having extremely low levels of halogen are provided.

A further aspect of the invention is a method for vulcanizing poly(isobutylene-co-4-methylstyrene). The method includes brominating the poly(isobutylene-co-4-methylstyrene) to obtain a poly(isobutylene-co-4-bromomethylstyrene) containing from 0.1 to 0.45 mole percent benzylic bromine. As another step, the poly(isobutylene-co-4-bromomethylstyrene) is compounded with a cure package. The method then includes the step of heating the compounded mixture to obtain a vulcanizate.

The cure package in the vulcanizable mixture and method described above preferably includes 0.2–6 phr HTS, 0.1–6 phr zinc oxide, 0–8 phr of a fatty acid or fatty acid metal salt, and 0–8 phr retarder. More preferably, the cure package includes 0.5 to 5 phr HTS, 2–4 phr zinc oxide, 0–2 phr stearic acid and 0–2 phr retarder.

DETAILED DESCRIPTION OF THE INVENTION

Brominated poly(isobutylene-co-4-methylstyrene) (BIMS) is well known in the art. The preparation of $C_4$–$C_7$ isoolefin/p-alkylstyrene copolymers is generally disclosed, for example, in U.S. Pat. No. 5,162,445 to Powers et al. and U.S. Statutory Invention Registration H1475 by Newman et al. which are hereby incorporated herein by reference. BIMS with a relatively high level of bromine, usually at least 0.5 mole percent benzylic bromide, is commercially available from Exxon under the designation EXXPOL™.

According to the present invention, the BIMS has a relatively low bromination level on the order of 0.1 to 0.45 mole percent benzylic bromine. Below this range, the crosslinking density obtained following vulcanization may be too low to be useful. Above this range, the polymer will be too tightly crosslinked using the same cure package to have useful properties, e.g. it will become stiff or brittle, or there may be unreacted benzylic bromine which can lead to instability. In a tire curing bladder this will cause reduced life of the vulcanizate, and undesirably increased adhesion or a tendency to co-cure with halobutyl tire innerliners. Within the range in accordance with the invention, the bromine content, as well as the other polymer properties and the choice of cure package can be adjusted and optimized to obtain desired properties of the resulting vulcanizate.

In general, the bromination level of the BIMS is controlled by limiting the amount of bromine reactant using the procedures and techniques disclosed in U.S. Pat. No. 5,162,445 to Powers et al. and U.S.S.I.R. H1475 by Newman et al. mentioned above.

In a preferred embodiment, the BIMS comprises from 0.5 to 10 mole percent p-methylstyrene of which approximately 5 to 30 percent has been converted to bromomethylstyrene, more preferably 0.5 to 4 mole percent methylstyrene of which approximately 10 percent has been converted to bromomethylstyrene. In a particularly preferred embodiment the BIMS has up to 2 mole percent, especially from 0.2 to 1 mole percent, total bromomethylstyrene and methylstyrene.

For use in tire curing bladders and other severe duty applications, the BIMS generally has a weight average molecular weight from about 50,000 to about 500,000, preferably from about 300,000 to about 450,000. Mooney viscosities at 125° C. from 30 up to 50 or 60 are common, with about 45 being typical. The particular molecular weight distribution of the BIMS will depend on the particular properties desired for the vulcanizate application. For example, the crosslinked BIMS according to the present invention, because it will have a relatively low extractables content and high stability, is contemplated as being useful in medical and pharmaceutical applications, such as pharmaceutical stoppers or closures, tubes, gaskets and caps used to handle blood and other biological fluids, and the like.

A preferred cure package according to the present invention is comprised of 1,6-hexamethylene-bis(sodium thiosulfate) (HTS) and zinc oxide. The 1,6-hexamethylene-bis(sodium thiosulfate) is commercially available under the trade designation DURALINK HTS which is sold as a reversion inhibitor for use in vulcanized general purpose rubber. In general, the cure package includes from 0.2 to 6 parts by weight HTS and from 0.1 to 6 parts by weight zinc oxide, per 100 parts BIMS and any other rubbery polymers present. The HTS is generally used in stoichiometric excess relative to the benzylic bromine functionality of the BIMS, preferably from 1 to 2 moles of HTS per mole of benzylic bromine in the BIMS. The zinc oxide is generally used in stoichiometric excess, typically about 2.5 moles of zinc per mole of HTS. In a preferred embodiment, the cure package includes from 0.5 to 5 phr HTS and from 2 to 4 phr zinc oxide.

The cure package can also include conventional accelerators and retarders. Accelerators include, for example, fatty acids such as stearic acid and fatty acid metal salts. The accelerators and retarders are preferably used in the cure package at up to 8 phr, more preferably from 0 to 2 phr.

The vulcanizable mixture of the BIMS and cure package may also be compounded with other additives conventionally used in the manufacture of tire curing bladders and other severe duty elastomers, such as fillers, including reinforcing fillers such as carbon black, anti-oxidants and anti-ozonants, oils and waxes, and the like.

Typically, the BIMS is first masterbatched on an internal mixer such as a Banbury mixer or its equivalent with the desired additives except the cure package ingredients, and blended until a predetermined temperature is reached, usually 150° C.–165° C. The masterbatch is then dumped and cooled. The masterbatch is then mixed at a lower temperature, usually less than 115° C. or 100° C., with the cure package ingredients (HTS, zinc oxide, accelerator(s) and retarder(s)) on a two-roll mill or an internal mixer to form the vulcanizable mixture of BIMS and cure package components.

The vulcanizable BIMS/curative mixture is then shaped or molded and cured using conventional vulcanization equipment. For example, tire curing bladders can be molded from the vulcanizable mixture by compression, injection or transfer molding machine. A cure meter is commonly used to determine the optimal cure time and temperature, although the actual cure time depends on the heating rate and thickness of the tire curing bladder.

The vulcanizates of the present invention can also be used to make other temperature-resistant molded articles such as hoses, gaskets and the like for use at temperatures above 100° C. or 150° C., for example. Because the present BIMS vulcanizates are very stable, inert, and have low extractables, they can also be used to make molded articles having utility in the medical and pharmaceutical arts where inert, stable materials are required, such as, for example, hoses, tubes, gaskets, seals and closures used to contain blood, urine, physiological saline, drugs, and other biological and therapeutic fluids.

EXAMPLES

In the following examples, brominated poly(isobutylene-co-p-methylstyrene) (BIMS) was obtained by brominating poly(isobutylene-co-p-methylstyrene) essentially as described in U.S. Pat. No. 5,162,445 to Powers et al. Some masterbatches were also prepared from isobutylene-p-methylstyrene copolymers blended with the more highly brominated BIMS of the prior art for comparative purposes. The compositions (as determined by proton NMR unless otherwise indicated) and Mooney viscosities of the various polymers used in the examples are listed in Table 1.

TABLE 1

| Polymer | PMS Content (mole %) | Br-PMS Content (mole %) | Mooney Viscosity |
|---|---|---|---|
| BIMS1 | 2.17* | 0.33** | 39 |
| BIMS2 | 2.12* | 0.38** | 45* |
| BIMS3 | 2.0* | 0.49* | 43 |
| BIMS4 | 2.04 | 0.24 | 48 |
| BIMS5 | 2.17 | 0.17 | 47 |
| BIMS6 | 2.22 | 0.23 | 45 |
| IMS1 | 2.62 | 0 | 49 |

*Nominal value, actual value not measured.
**As determined by FTIR.

Masterbatches were prepared by standard methods using a Banbury mixer. Unless otherwise stated, the masterbatches included 100 parts by weight BIMS or other rubber, 55 phr N330 carbon black, 7 phr mineral oil and 2 phr paraffin wax blended in a Banbury mixer until the temperature reached 165° C. Cure additives were blended into the masterbatch on a two-roll mill keeping the temperature below 100° C. Cure characteristics were evaluated using a Monsanto rheometer ODR (arc 1°). Delta torque is the maximum torque (MH) minus minimum torque (ML). Scorch safety (Ts2) is the time at which torque rises 2 torque units (dNm) above ML. Tc(90) is the time to 90 percent of delta torque above minimum torque.

Tension set was evaluated before and after oven aging by elongating a specimen 300 percent for 20 minutes at room temperature and measuring the percentage of non-recovery after resting for 20 minutes. Samples were oven aged for 48 hours at 177° C., followed by resting for 20 minutes before evaluating tension set. Hot tension set was evaluated by elongating a specimen 200 percent at 150° C. for 20 minutes and relaxing the specimen for 20 minutes before evaluating the percentage of non-recovery.

EXAMPLES 1-4

Two BIMS masterbatches were mixed with a cure package of 2 phr zinc oxide, 0.8 phr DURALINK HTS and 0.25 phr DHT vulcanization retarder. For comparison purposes, the highly brominated BIMS3 and a blend of the BIMS3 (70 weight percent) with the backbone polymer IMS 1 (30 weight percent), were also masterbatched with the same additive recipe. The blend had an overall benzylic bromide content of about 0.35 mole percent. The compositions and test results are presented in Table 2.

TABLE 2

| EXAMPLE | 1 | 2 | 3 | 4 |
|---|---|---|---|---|
| Composition (phr) | | | | |
| BIMS1 | 100 | — | — | — |
| BIMS2 | — | 100 | — | — |
| BIMS3 | — | — | 100 | 70 |
| IMS1 | — | — | — | 30 |
| N330 Black | 55 | 55 | 55 | 55 |
| Mineral Oil | 7 | 7 | 7 | 7 |
| Paraffin Wax | 2 | 2 | 2 | 2 |
| ZnO | 2 | 2 | 2 | 2 |
| DURALINK HTS | 1.6 | 1.6 | 1.6 | 1.6 |
| DHT4A2 | 0.25 | 0.25 | 0.25 | 0.25 |
| ODR @ 190° C., 1° arc, 60 min | | | | |
| MH (dNm) | 31.69 | 27.2 | 31.63 | 11.76 |
| ML (dNm) | 5.87 | 5.92 | 5.88 | 5.86 |
| Ts2 (min) | 3.29 | 2.67 | 3.07 | 5.85 |
| Tc(90) (min) | 22.56 | 18.34 | 22.26 | 31.34 |

TABLE 2-continued

| EXAMPLE | 1 | 2 | 3 | 4 |
|---|---|---|---|---|
| Tensile Properties (before oven aging) | | | | |
| Break Strength (MPa) | 11.14 | 12.78 | 12.62 | 9.82 |
| Elongation at Break (%) | 343 | 355 | 258 | 243 |
| 100% Modulus (MPa) | 2.35 | 2.52 | 3.3 | 3.3 |
| 200% Modulus (MPa) | 5.98 | 6.62 | 8.83 | 8.28 |
| 300% Modulus (MPa) | 9.83 | 11.15 | — | — |
| Tension Set (E %) | 6.25 | 3.44 | — | — |
| Tensile Properties (after oven aging 48 hours @ 177° C.) | | | | |
| Break Strength (MPa) | 8.56 | 11.82 | 14.55 | 9.46 |
| Elongation at Break (%) | 433 | 411 | 277 | 294 |
| 100% Modulus (MPa) | 1.99 | 2.46 | 3.83 | 2.94 |
| 200% Modulus (MPa) | 4.08 | 5.38 | 10.04 | 6.68 |
| 300% Modulus (MPa) | 6.33 | 8.92 | — | — |
| Tension Set (E %) | 13.5 | 7.5 | — | — |

These results show that the vulcanizable mixture of BIMS and the HTS/ZnO cure package have excellent vulcanization properties as indicated by the good ODR times for Ts2 and Tc(90). The relatively low delta torque (MH–ML), and strength and elongation at break, for the blend of Example 4 shows that the cure for the blend of highly brominated BIMS3 with the backbone copolymer IMS1 is not comparable to the BIMS1 and BIMS2 masterbatches, even though the overall bromine content is about the same. Note that neither vulcanizate of Examples 3 and 4 could be elongated to 300 percent, indicating that these materials were too stiff and brittle (Example 3) or insufficiently crosslinked and too weak (Example 4 blend) for use in tire curing bladders. The tensile properties of the materials of Examples 1 and 2 indicate that they are excellent materials for use in tire curing bladders. The tensile properties in Examples 1 and 2 after oven aging, particularly tension set, are comparable to the properties before oven aging and represent a marked improvement.

EXAMPLES 5-7

Masterbatches were made as in Examples 1-4 with BIMS4 and BIMS5 and mixed with cure packages as shown together with resulting cure and property data in Table 3.

TABLE 3

| EXAMPLE | 5 | 6 | 7 |
|---|---|---|---|
| Composition (phr) | | | |
| BIMS4 | 100 | — | — |
| BIMS5 | — | 100 | 100 |
| N330 Black | 55 | 55 | 55 |
| Mineral Oil | 7 | 7 | 7 |
| Paraffin Wax | 2 | 2 | 2 |
| ZnO | 2 | 2 | 3 |
| Duralink HTS | 1.6 | 1.6 | 1.5 |
| Stearic Acid | — | — | 0.6 |
| ODR @ 190° C., 1° arc, to plateau MH | | | |
| MH (dNm) | 25.8 | 21.0 | 17.9 |
| ML (dNm) | 6.3 | 5.6 | 5.7 |
| Ts2 (min) | 3.3 | 6.8 | 2.5 |
| Tc(90) (min) | 23.4 | 120 | 15.6 |
| Tensile Properties (Unaged) at Room Temperature | | | |
| Break Strength (MPa) | 16.0 | 12.5 | 12.4 |
| Elongation at Break (%) | 405 | 558 | 557 |
| 300% Tension Set (E %) | 1.3 | 18.8 | 8 |

TABLE 3-continued

| EXAMPLE | 5 | 6 | 7 |
|---|---|---|---|
| Tensile Properties (Unaged) @ 150° C. | | | |
| Break Strength (MPa) | 6.2 | 5.8 | 4.1 |
| Elongation at Break (%) | 386 | 317 | 375 |
| 200% Hot Tension Set (E %) | 16.0 | 24 | 40 |

These examples show that good properties with ZnO/HTS cure package can be obtained at the low benzylic bromine level of 0.24 and 0.17 mole percent of BIMS4 and BIMS5.

Example 7 shows that the cure package can be modified to yield a faster cure by adding an accelerating ingredient such as stearic acid to overcome the slow cure resulting from low bromine (Example 6).

EXAMPLES 8–15

A masterbatch was prepared with BIMS6 and 55 phr of carbon black N234, 5 phr of mineral oil, and 5 phr of paraffin wax. This masterbatch was accelerated with a variety of cure packages. Example 8 has a cure package based on ZnO/HTS while Examples 9–15 are based on historically established cure packages for BIMS polymers. In Table 4, ZDEDC is zinc diethyldithiocarbamate; TMTD is tetramethylthiuram disulfide; DPTTS is dipentamethylenethiuram tetrasulfide; MBTS is 2-mercaptobenzothiazyl disulfide; DHT4A2 is magnesium aluminum hydroxycarbonate (CAS No. 11097-59-9); and resin SP1045 is polymethylol phenol-formaldehyde curing resin obtained from Schenectady Chemicals, Inc. The cure packages and resulting ODR cure data are shown in Table 4.

Example 8 shows that the low-bromine BIMS6 with the ZnO/HTS cured well and gave a satisfactory vulcanization for use as a tire curing bladder. Examples 9–15 show that previously established cures for BIMS do not yield acceptable cures based on MH-ML torque and appearance, although they are fast cures. Examples 9, 10 and 12–15 also show cure reversion which is undesirable for hot aging stability. ZnO/HTS on the other hand yields good cure data and good cured polymer appearance which were shown in Examples 1–2 and 5–8 to also yield good properties.

The present invention is illustrated by the foregoing examples and description. Various modifications and changes will occur to those skilled in the art in view of this disclosure. All such variations and modifications which are within the scope and spirit of the appended claims are intended to be embraced thereby.

We claim:

1. A vulcanizable mixture consisting essentially of poly (isobutylene-co-4-bromomethylstyrene) and a cure package wherein the poly(isobutylene-co-4-bromomethylstyrene) comprises from 0.1 to 0.45 mole percent benzylic bromine.

2. The vulcanizable mixture of claim 1, wherein the cure package comprises 1,6-hexamethylene-bis(sodium thiosulfate), zinc oxide, optionally an accelerator and optionally a retarder.

3. A vulcanized poly(isobutylene-co-4-bromomethylstyrene) obtained by vulcanizing the mixture of claim 1.

4. A vulcanized poly(isobutylene-co-4-bromomethylstyrene) obtained by vulcanizing the mixture of claim 2.

5. A curing bladder comprising the vulcanized poly (isobutylene-co-4-bromomethylstyrene) of claim 3.

6. A curing bladder comprising the vulcanized poly (isobutylene-co-4-bromomethylstyrene) of claim 4.

TABLE 4

| Example | 8 | 9 | 10 | 11 | 12 | 13 | 14 | 15 |
|---|---|---|---|---|---|---|---|---|
| | Composition (phr) | | | | | | | |
| BIMS6 | 100 | 100 | 100 | 100 | 100 | 100 | 100 | 100 |
| B234 Black | 55 | 55 | 55 | 55 | 55 | 55 | 55 | 55 |
| Mineral Oil | 5 | 5 | 5 | 5 | 5 | 5 | 5 | 5 |
| Paraffin Wax | 5 | 5 | 5 | 5 | 5 | 5 | 5 | 5 |
| ZnO | 3 | 1 | 2 | 1 | 1 | 1 | 3 | 3 |
| Duralink HTS | 1.5 | — | — | — | — | — | — | — |
| Stearic Acid | 0.25 | 2 | — | 2 | 2 | 2 | 0.5 | 0.5 |
| Zinc Stearate | — | 1 | 3 | — | — | — | — | — |
| ZDEDC | — | — | — | 1.5 | — | — | — | — |
| TMTD | — | — | — | — | 0.2 | — | — | — |
| DPTTS (Sulfads) | — | — | — | — | — | 1 | — | — |
| MBTS | — | — | — | — | — | — | 1.2 | 1.2 |
| DHT4A2 | — | — | — | — | — | — | 1.1 | — |
| Sulfur | — | — | — | — | — | — | 0.75 | 0.75 |
| Resin SP1045 | — | — | — | — | — | 7 | 7 | |
| | ODR @ 190° C. 1° arc, 60 min | | | | | | | |
| MH-ML (dNm) | 17.2 | 6.5 | 5.9 | 4.5 | 9.6 | 8.6 | 3.3 | 6.1 |
| Ts2 (min) | 3.2 | 1.9 | 2.0 | 1.3 | 1.5 | 1.4 | 7 | 2.6 |
| Tc(90) (min) | 29.8 | 5.7 | 6.0 | 3.3 | 6.8 | 4.4 | 11.3 | 5.0 |
| Comments: | | | | | | | | |
| Cure Curve | Stable | R | R | — | R | R | R | R |
| Cured Polymer | F | S/T | S/T | SEF | SEF | SEF | SEF/B | SEF/B |

Index of Comments:
R = Slight Reversion
SEF = Semi-Firm
F = Firm
B = Blistered
S/T = Soft and Tacky 7. A hose useful at elevated temperature comprising the vulcanized poly(isobutylene-co-4-bromomethylstyrene) of claim 3.

8. A hose useful at elevated temperature comprising the vulcanized poly(isobutylene-co-4-bromomethylstyrene) of claim 4.

9. A gasket comprising the vulcanized poly(isobutylene-co-4-bromomethylstyrene) of claim 3.

10. A gasket comprising the vulcanized poly(isobutylene-co-4-bromomethylstyrene) of claim 4.

11. A pharmaceutical stopper comprising the vulcanized poly(isobutylene-co-4-bromomethylstyrene) of claim 3.

12. A pharmaceutical stopper comprising the vulcanized poly(isobutylene-co-4-bromomethylstyrene) of claim 4.

13. A vulcanizate of a poly(isobutylene-co-4-bromomethylstyrene) containing a mixture of claim 1 vulcanized to an extent wherein the vulcanizate is essentially free of benzylic bromine.

14. A method for vulcanizing poly(isobutylene-co-4-methylstyrene), comprising the steps of:

brominating the poly(isobutylene-co-4-methylstyrene) to obtain a poly(isobutylene-co-4-bromomethylstyrene) containing from 0.1 to 0.45 mole percent benzylic bromine;

compounding the poly(isobutylene-co-4-bromomethylstyrene) with a cure package; and heating the compounded mixture to vulcanize the poly(isobutylene-co-4-bromomethylstyrene).

15. The vulcanizable mixture of claim 2 wherein the cure package comprises from 0.2 to 6 phr 1,6-hexamethylene-bis(sodium thiosulfate), from 0.1 to 6 phr zinc oxide, from 0 to 8 phr of a fatty acid or fatty acid metal salt, and from 0 to 8 phr retarder.

16. The method of claim 14, wherein the cure package comprises from 0.2 to 6 phr 1,6-hexamethylene-bis(sodium thiosulfate), from 0.1 to 6 phr zinc oxide, from 0 to 8 phr of a fatty acid or fatty acid metal salt, and from 0 to 8 phr retarder.

17. The vulcanizable mixture of claim 15, wherein the cure package comprises from 0.5 to 5 phr 1,6-hexamethylene-bis(sodium thiosulfate), from 2 to 4 phr zinc oxide, from 0 to 2 phr stearic acid and 0 to 2 phr retarder.

18. Poly(isobutylene-co-4-bromomethylstyrene-co-4-methylstyrene) comprising 0.1 to 0.45 mole percent benzylic bromine wherein the total bromomethylstyrene and methylstyrene content is less than 2 mole percent.

19. The copolymer of claim 18 wherein the total bromomethylstyrene and methylstyrene content is from 0.2 to 1 mole percent.

20. A brominated interpolymer of a $C_4$ to $C_7$ isoolefin and a para-alkylstyrene comprising from 0.1 to 0.45 mole percent bromine-substituted para-alkylstyrene and up to 2 mole percent total substituted and unsubstituted para-alkylstyrene.

* * * * *